United States Patent
Park et al.

(10) Patent No.: US 9,685,770 B2
(45) Date of Patent: Jun. 20, 2017

(54) VACUUM WALL-THROUGH STRUCTURE

(71) Applicant: KOREA ASTRONOMY AND SPACE SCIENCE INSTITUTE, Daejeon (KR)

(72) Inventors: Chan Park, Daejeon (KR); Moo-Young Chun, Daejeon (KR); Jae Sok Oh, Daejeon (KR); Jakyoung Nah, Daejeon (KR)

(73) Assignee: Korea Astronomy and Space Science Institute, Daejeon (KR)

( * ) Notice: Subject to any disclaimer, the term of this patent is extended or adjusted under 35 U.S.C. 154(b) by 586 days.

(21) Appl. No.: 13/851,089

(22) Filed: Mar. 26, 2013

(65) Prior Publication Data

US 2013/0248245 A1   Sep. 26, 2013

(30) Foreign Application Priority Data

Mar. 26, 2012 (KR) .................. 10-2012-0030514

(51) Int. Cl.
   *H02G 3/22* (2006.01)
   *G21B 1/17* (2006.01)

(52) U.S. Cl.
   CPC .............. *H02G 3/22* (2013.01); *G21B 1/17* (2013.01)

(58) Field of Classification Search
   CPC .......... H02G 3/22; H02G 3/083; H02G 3/088; H02G 3/18; H02G 3/24; H02G 15/013; H02G 3/30; H02G 3/32; H02G 11/00; H02G 11/006; H01B 9/06; H01B 17/26; H01B 17/265; H01B 17/583; H01B 17/30; B60R 16/0222; F16L 59/121; F16L 3/00; F16L 3/02; F16L 3/08; F16L 3/137; F16L 3/22; F16L 3/223; F16L 3/23; F16L 3/233; F16L 3/237; H01R 9/16; H01R 13/518; H05K 9/0015; A61M 5/1418; A47B 2097/003
   USPC ...... 174/151, 152 G, 153 G, 152 R, 650, 24; 248/68.1, 56
   See application file for complete search history.

(56) References Cited

U.S. PATENT DOCUMENTS

| | | | | |
|---|---|---|---|---|
| 3,742,119 A * | 6/1973 | Newman | ............... | H02G 3/088 174/155 |
| 4,599,487 A * | 7/1986 | Blank | ................. | H02G 15/013 174/151 |
| 5,971,444 A * | 10/1999 | Hawkins | ...................... | 285/206 |
| 6,218,625 B1 * | 4/2001 | Pulaski | ............... | B60R 16/0222 174/153 G |
| 8,178,795 B2 * | 5/2012 | Roy | ............................ | 174/666 |
| 2009/0224111 A1 * | 9/2009 | Gilbreath | ..................... | 248/68.1 |
| 2010/0187371 A1 * | 7/2010 | Milton | ........................ | 248/74.1 |
| 2011/0080078 A1 * | 4/2011 | Perschon et al. | .......... | 312/293.1 |

(Continued)

FOREIGN PATENT DOCUMENTS

KR   10-2003-0060512 A   7/2003

OTHER PUBLICATIONS

WO 2012/032157 English Translation.*

*Primary Examiner* — Pete Lee
(74) *Attorney, Agent, or Firm* — Rabin & Berdo, P.C.

(57) ABSTRACT

Disclosed is a vacuum wall-through structure to be installed in a hole formed in a wall of a vacuum chamber. The vacuum wall-through structure includes a cable holder that holds a cable at the center thereof and a cable holder cover installed outside the cable holder.

7 Claims, 9 Drawing Sheets

(56) References Cited

U.S. PATENT DOCUMENTS

2012/0006576 A1* 1/2012 Barry .................. A61N 1/3754
174/50.6

* cited by examiner

VACUUM WALL-THROUGH STRUCTURE

BACKGROUND OF THE INVENTION

Field of the Invention

The present invention relates to a vacuum wall-through structure, and, more particularly, to a vacuum wall-through structure of a cable carrying information from an imaging array detector used in a cryogenic equipment in the field of infrared camera or infrared spectrograph, for example.

Description of the Related Art

Conventionally, in the field of infrared imaging instruments, a wall-through structure of an electronic cable to readout signal from a detector in a cryogenic vacuum chamber used to depending on the product type of the manufacturing companies and it is virtually unavailable to modify the cable type since the product has been particularly optimized for the detector system performance.

The basic principle of the operation of an infrared detector is that sensing material in each pixel of an array is to be stimulated with infrared photons and the intensity of infrared radiation is measured based on the number of electrons generated by the stimulation. As for the material of the highly sensitive infrared detectors, "HgCdTe" produced by Teledyne Technologies inc. and "InSb" by Raytheon Company have most widely been used. Both products are manufactured very sophisticatedly and are in the high-end of state-of-the-art of the current technology. Therefore, it is virtually impossible for any end user to modify or change the design of the detector kit provided by the vendors.

A data readout electronic device installed in a cryogenic environment to carry information from inside to outside of a cryostat has to be maintaining a perfect vacuum condition while being used. However, they need to be separated and stored safely while they are not being used so that the imaging sensor will not be damaged by static electricity or external shocks. That is, there is the demand for the development of a data input/output peripheral wall-through structure which is readily attachable into and detachable out of the main cryostat chamber.

Korean Patent Application Laid-Open No. 2003-0060512 discloses a sensor cable assembly of a robot to be installed in a vacuum chamber as an example of the related art.

SUMMARY OF THE INVENTION

Accordingly, the present invention has been made keeping in mind the above problems occurring in the related art, and is intended to provide a wall-through structure of a cable for carrying information from an infrared detector in cryogenic equipment in which the wall-structure allows a vacuum state and a cryogenic environment to be maintained inside a radiation shield (or a cold box) when attaching a cable holder to the cryogenic equipment.

In order to achieve the above object, according to one aspect of the present invention, there is provided a vacuum wall-through structure including a cable holder to be installed in a hole formed in a wall of a vacuum chamber, which holds a cable at the center, and a cable holder cover installed outside the cable holder.

The cable holder may be composed of a first cable holder and a second cable holder that have the same structure and exist as a pair, and the first cable holder and the second cable holder engage with each other to hold the cable between them.

When the first cable holder and the second cable holder are engaged with each other, an epoxy resin may be interposed between the first cable holder and the second cable holder.

In addition, a first O-ring groove may be formed in the cable holder or in an inner surface of the cable holder cover and a first O-ring may be inserted in the first O-ring groove to provide a hermetic seal between the cable holder and the inner surface of the cable holder cover.

The cable holder cover may be provided with second coupling structures and forth coupling structures to be coupled to first coupling structures of the first cable holder and third coupling structures of the second cable holder, respectively so that the first cable holder and the second cable holder are independently coupled to the cable holder cover.

The cable holder cover may be provided with sixth coupling structures to be coupled to fifth coupling structures of the vacuum chamber so that the cable holder cover can be coupled to the vacuum chamber.

An interval between the first coupling structures and between the second coupling structures and an interval between the third coupling structures and between the fourth coupling structures are shorter than the intervals between the fifth coupling structures and between the sixth coupling structures.

A second O-ring groove may be formed in the inner surface of the cable holder cover or in a wall surface of the vacuum chamber and a second O-ring may be inserted in the second O-ring groove to provide a hermetic seal between the vacuum chamber and the inner surface of the cable holder cover.

The first cable holder may have a first engaging groove and a first engaging protrusion, and the second cable holder may have a second engaging groove and a second engaging protrusion so that the second engaging protrusion is inserted into the first engaging groove and the first engaging protrusion is inserted into the second engaging groove so that they engage each other.

Alternatively, the first cable holder may have a first engaging hole and a second engaging hole formed in a side surface of the first cable holder, and the second cable holder may have a third engaging hole and a fourth engaging hole formed in a side surface of the second cable holder so that the first cable holder and the second cable holder can be combined by inserting a first fixing pin into the first engaging hole and third engaging hole and inserting a second fixing pin into the second engaging hole and the fourth engaging hole.

Contact surfaces of the first cable holder and the second cable holder may be three-dimensional so that tighter contact is achieved between the contact surfaces of the first cable holder and the second cable holder.

The first cable holder and the second cable holder are preferably combined in a manner such that a boundary line separating the first cable holder from the second cable holder is located along the first O-ring at the location where the boundary line meets the first O-ring.

The vacuum wall-through structure according to the present invention is connected with the inside of cryogenic vacuum equipment so that information can be carried out in a state in which an interior condition of a radiation shield (or cold box) remains a cryogenic vacuum environment. Moreover, since the cable is connected in a manner of being pushed into or pulled out when the cable is connected for use or when the cable is disconnected for storage because the detector is susceptible to shocks or statistic electricity, the cable can be easily connected and disconnected.

BRIEF DESCRIPTION OF THE DRAWINGS

The above and other objects, features and further advantages of the present invention will be more clearly understood from the following detailed description when taken in conjunction with the accompanying drawings, in which.

DETAILED DESCRIPTION OF THE INVENTION

Hereinbelow, preferred embodiments of the invention will be described in detail with reference to the accompanying drawings. Unless otherwise defined, all terms used in this specification and claims, including technical or specific terms, should be contextually interpreted in light of the concept of the present invention and are not to be interpreted to have ideal or expressively formal meanings defined in a generally used dictionary based on the rule that inventors can define specific terms so as to most properly describe their inventions.

The structure described in the section 'embodiments' of this specification and drawings are just provided to serve as examples, and do not represent all of the technical concepts of the present invention. Accordingly, it can be understood that there may be various equivalents and modifications at the time when the present application is filed.

Figure 1:
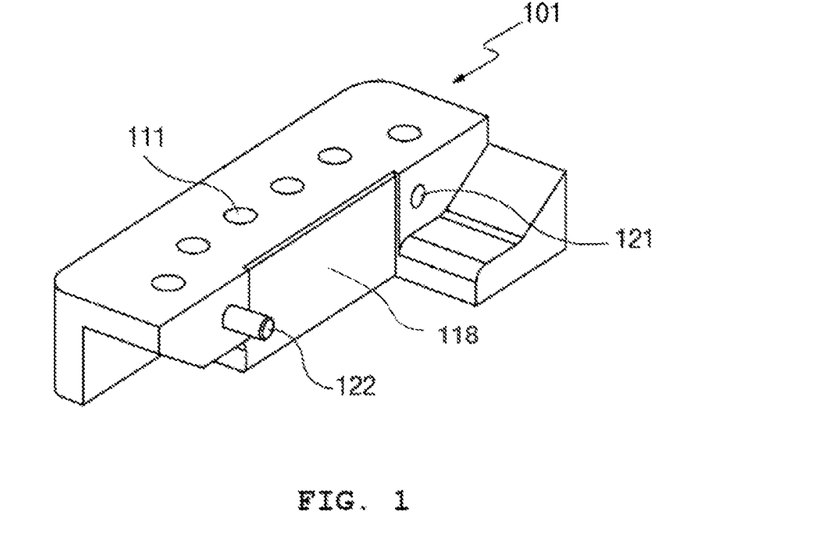
FIG. 1 is a perspective view illustrating a first cable holder according to a first embodiment of the present invention.
Figure 2:
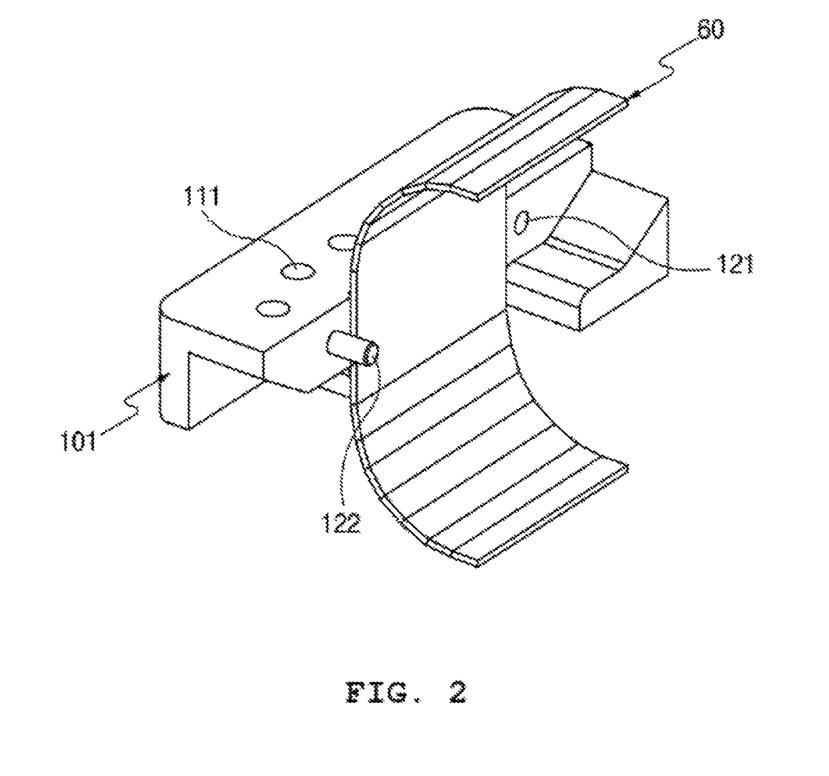
FIG. 2 is a perspective view illustrating the principle used to combine a cable, which extends inside and outside a cable holder, with a cable holder.
Figure 3:
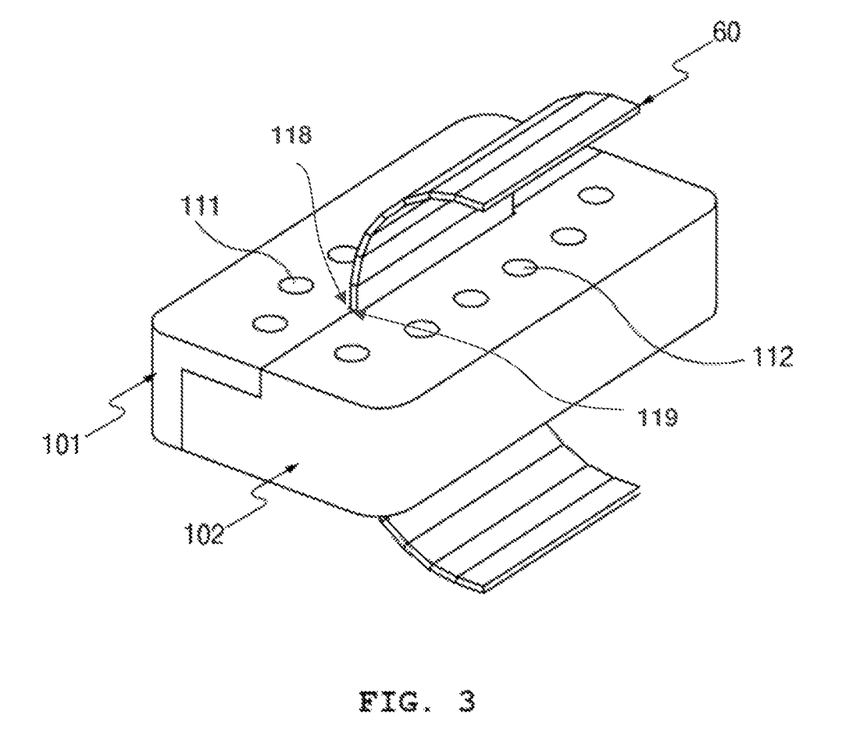
FIG. 3 is a perspective view illustrating a state in which the cable is fixed between the first cable holder and the second cable holder.

FIG. 1 is a perspective view illustrating a first cable holder according to a first embodiment, FIG. 2 is a perspective view illustrating the principle used to combine a cable with a cable holder, and FIG. 3 is a perspective view illustrating a state in which the cable is fixed between the first cable holder and a second cable holder that are combined each other. As illustrated in FIGS. 1 to 3, a first cable holder 101 and a second cable holder 102 are combined by engaging with each other and the cable 60 is held between the first and the second cable holders 101 and 102.

According to the first embodiment, the first cable holder 101 has first coupling grooves and first coupling protrusions and the second cable holder 102 has second coupling grooves and second coupling protrusions, so that the first and second cable holders 101 and 102 are combined in a manner that the second coupling protrusions are inserted into the first coupling grooves 121 and the first coupling protrusions 122 are inserted into the second coupling grooves.

Figure 4:
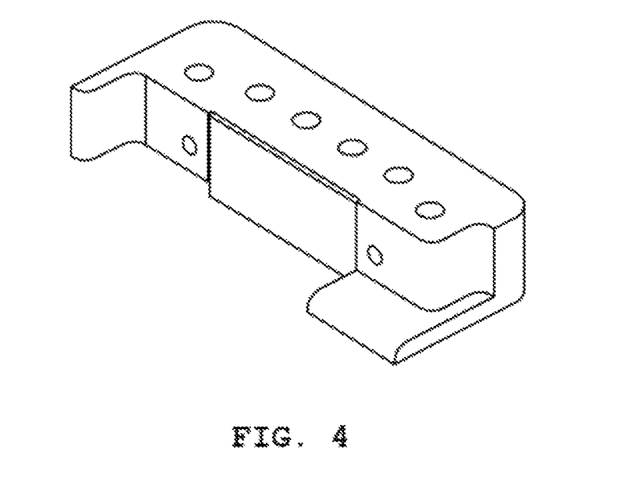
FIG. 4 is a perspective view illustrating a first cable holder according to a second embodiment of the present invention.
Figure 5:
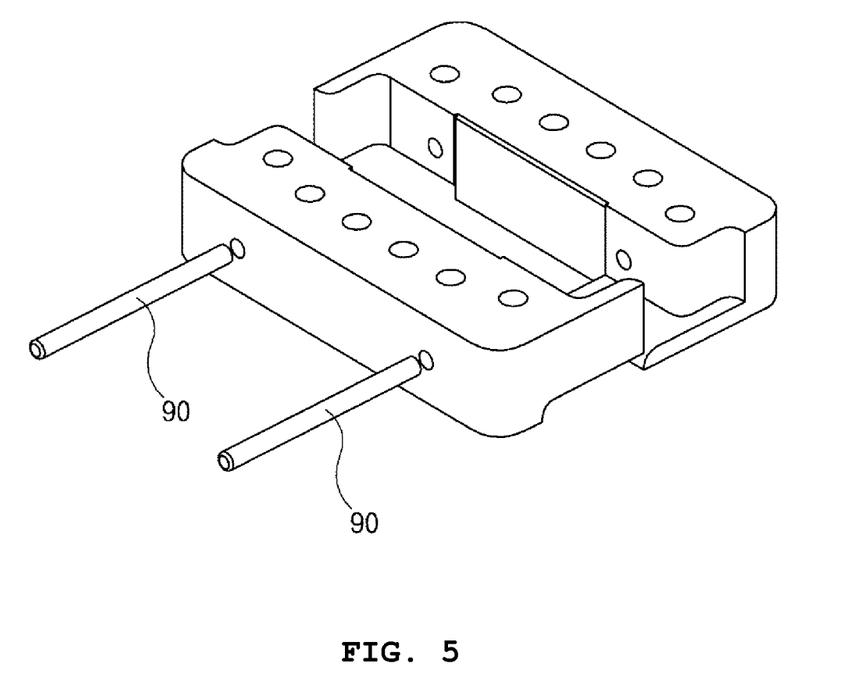
FIG. 5 is a diagram illustrating the principle of combination of the first cable holder and a second cable holder.

FIG. 4 illustrates a first cable holder 101 according to a second embodiment, and FIG. 5 illustrates a principle of combination of a first cable holder 101 according to the second embodiment with a second cable holder 102. Specifically, the first cable holder 101 preferably has a first coupling hole 141 and a second coupling hole 142 which are through-holes completely passing through the body of the first cable holder 101 from one side to the other side or which may be holes formed in an inner surface (contact surface) of the first cable holder 101. The second cable holder 102 preferably has a third coupling hole 151 and a fourth coupling hole 152 which may be through-holes completely passing through the body of the second cable holder 102 from one side to the other side or which may be holes formed in an inner surface (contact surface) of the second cable holder 102. The first cable holder 101 and the second cable holder 102 may be combined by inserting a first fixing pin 91 into the first coupling hole 141 and the third coupling hole 151 and by inserting a second fixing pin 92 into the second coupling hole 142 and the fourth coupling hole 152. The objective of the second embodiment is the same as that of the first embodiment, but the manufacture of this structure is much easier than that of the first embodiment.

The respective contact surfaces of the first cable holder 101 and the second cable holder 102 are not planar but three-dimensional to perfectly fit each other so that there may be no gap between the contact surfaces. Because of the cryogenic vacuum environment in which the structure of the present invention is used, the three-dimensional contact surfaces serve to prevent individual parts of the cable holder from becoming loose or falling out, which may result in the contact surfaces becoming separated from each other or the cable holder falling apart.

In addition, an epoxy resin may be put between the contact surfaces of the first cable holder 101 and the second cable holder 102 to ensure that there is no gap between the first cable holder 101 and the second holder 102, so as to put the first cable holder 101 and the second cable holder 102 in tighter contact with each other.

When the contact surfaces of the first and second cable holders 101 and 102 are not planar but three-dimensional, the area (length and width) of a contact portion between the first cable holder 101 and the second cable holder 102 can be increased. Accordingly, the area to which the epoxy resin can be applied is increased compared to the structure in which the contact portions are planar. This more thoroughly blocks the intrusion of external air.

The cable 60 used in the embodiments of the present invention is a flat cable with a predetermined thickness which has the same shape as a cable recommended by Teledyne Technologies inc. which produces infrared detectors. However, the shape of the cable 60 is not limited thereto. In other words, when a cable with a different shape from the cable 60 is used, the shape of the contact surface (118) between the cable 60 and the first cable holder 101 and the shape of the contact surface (119) between the cable 60 and the second cable holder 102 are also different from that of the present embodiment so as to correspond to the shape of the cable used. In this case, it is also guaranteed that no gap exists between the cable holder and the cable 60.

Figure 6:
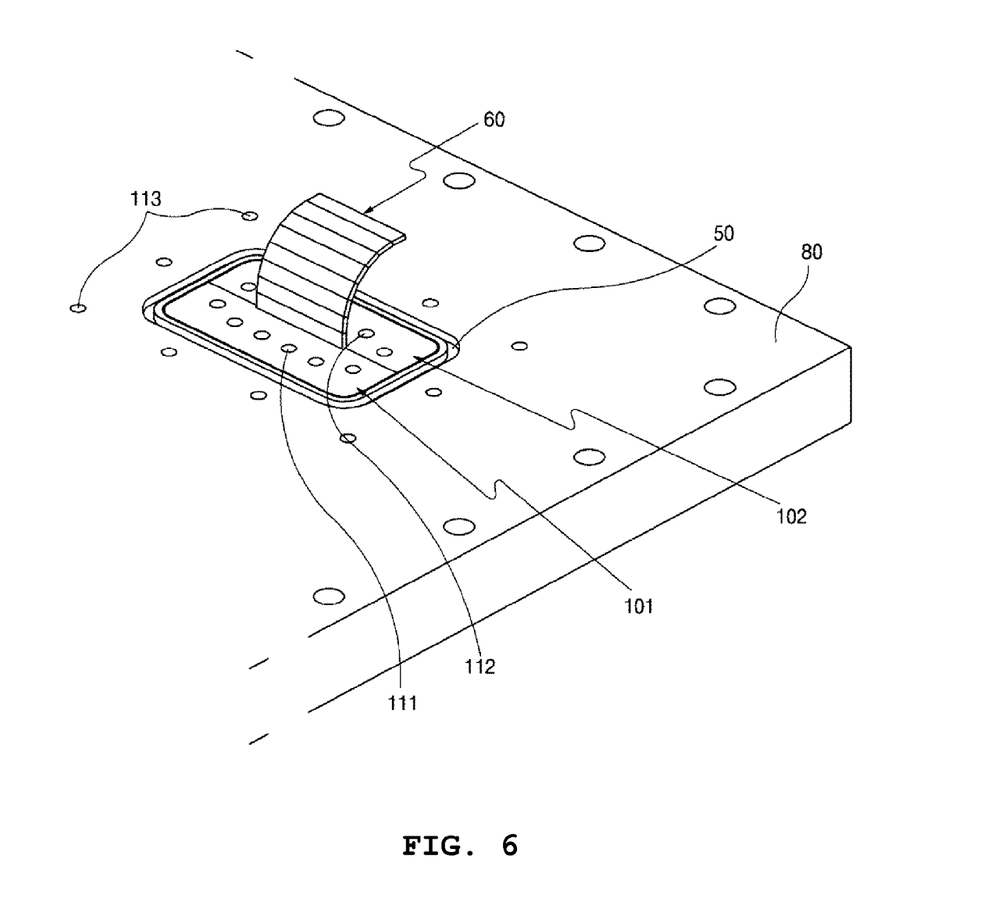
FIG. 6 is a perspective view illustrating a state in which the structure of FIG. 3 is coupled to a vacuum chamber.

FIG. 6 is a perspective view illustrating a state in which the structure of FIG. 3 is combined with a vacuum chamber 50. The vacuum chamber 50 is isolated from an external environment to protect or keep an internal environment, i.e., a vacuum condition, in which an infrared detector is installed, from changing. The shape of a cable holder installation hole 80 formed in a wall of the vacuum chamber 50 corresponds to the outer contour of the combined structure of the first cable holder 101 and the second cable holder 102 and the hole 80 is as small as possible as long as the infrared detector can pass therethrough to be removed from the vacuum chamber when the infrared detector is removed to be safely stored, and as long as the combined structure of the cable holder and the cable are able to be inserted.

Figure 7:
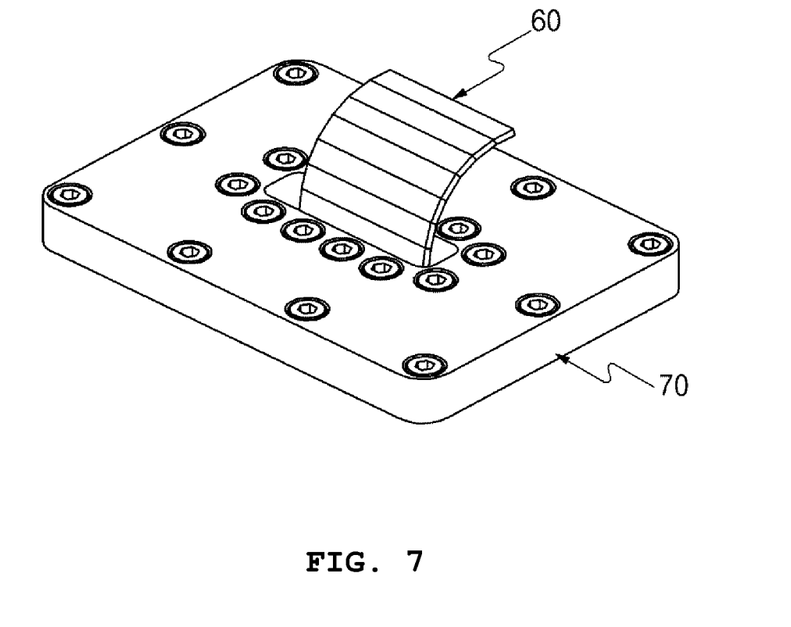
FIG. 7 is a perspective view illustrating a cable holder cover.
Figure 8:
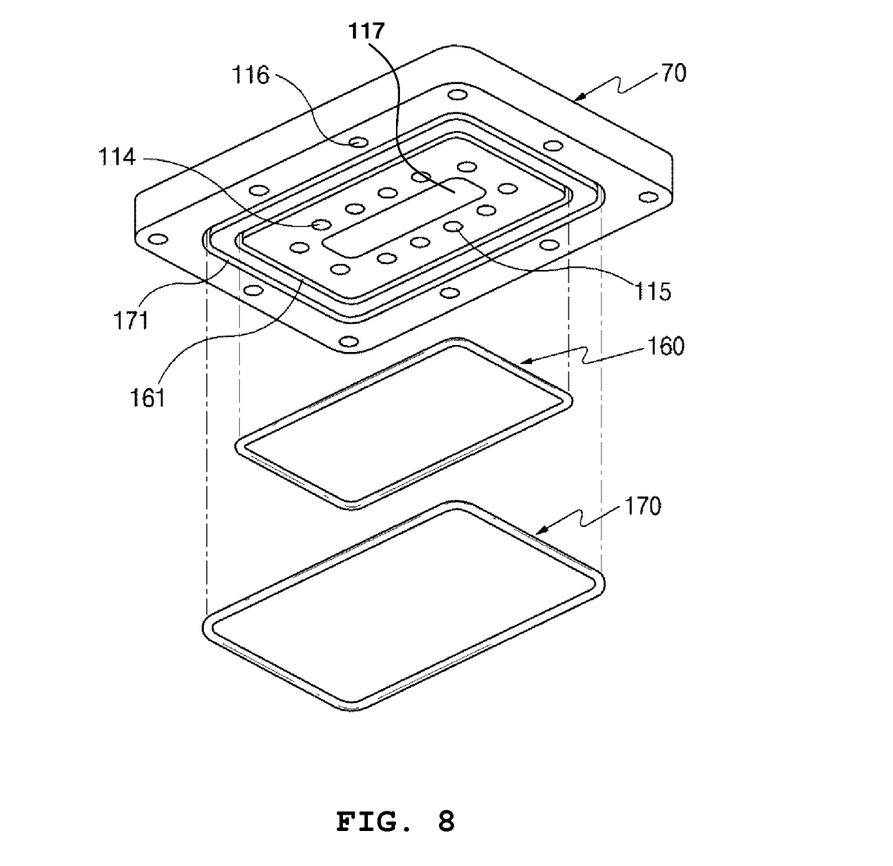
FIG. 8 is a diagram illustrating a second O-ring provided to the cable holder cover.

A first O-ring groove 161 is preferably formed in an inner surface of a cable holder cover or in the cable holder and a first O-ring 160 is preferably inserted in the first O-ring groove 161 to secure a hermetic seal between the cable holder and the inner surface of the cable holder cover 70. Generally, it is more effective for an O-ring groove to be formed in the inner surface of a cover. Accordingly, in the present embodiment, the O-ring groove 161 is formed in the inner surface of the cable holder cover 70 that is shown in FIGS. 7 and 8.

The first O-ring 160 and the first O-ring groove 161 are located such that the first O-ring 160 protrudes by a predetermined thickness towards the center of the cable holder cover from the inner surface of the cable holder cover 70 which corresponds to the outer circumferential surface of an upper portion of the cable holder which is the combined structure of the first and second cable holders. The first O-ring 160 blocks the external air from entering the vacuum chamber through a gap between the cable holder installation hole 80 and the cable holder.

Referring to FIG. 5 which illustrates the second embodiment of the present invention, when the first cable holder 101 and the second cable holder 102 are combined, a boundary line appears on the three-dimensional top surface of the combined cable holder. The boundary line is located to follow along the first O-ring 160 so that a hermetic seal can be imparted to where the boundary line meets the first O-ring 160.

A second O-ring groove 171 is formed in the inner surface of the cable holder cover 70 or in a wall portion of the cable holder installation hole 80 of the vacuum chamber 50 and a second O-ring 170 is inserted in the second O-ring groove 171 in order to ensure a hermetic seal between the vacuum chamber 50 and the inner surface of the cable holder cover 70. Here, FIG. 8 shows that the first and second O-ring grooves 161 and 171 are formed in the inner surface of the cable holder groove 70 and the first and second O-rings 160 and 170 are inserted in the respective O-ring grooves 161 and 171.

Specifically, the second O-ring 170 and the second O-ring groove 171 are located such that the second O-ring 170 protrudes inward from the inner surface of the cable holder cover 70 which corresponds to the outer circumferential surface of an upper portion of the assembled cable holder by a predetermined distance, so that the second O-ring 170 and the second O-ring groove 171 prevent external air introduced through the gap formed under the lower end of the cable holder cover 70 from entering the vacuum chamber through a gap formed along the edge of the cable holder installation hole 80.

The first O-ring 160 and the second O-ring 170 are preferably formed of synthetic resin which is suitable for use in a high vacuum condition.

Fifth coupling structures 113 are arranged at regular intervals in a wall of the vacuum chamber 50 along the circumference of the cable holder installation hole 80. The structural feature of the fifth coupling structures 113 will be described with reference to FIG. 5 which illustrates the cable holder cover. The coupling structures 113 couple the cable holder cover 70, which covers the cable holder, to the vacuum chamber 50. The coupling structures 113 are arranged so that they correspond to sixth coupling holes 116 which are through holes passing through an upper portion of the cable holder cover 70 and are arranged at regular intervals along the circumference of the upper portion of the cable holder cover 70. The thickness of the fifth coupling structures 113 is smaller than the thickness of the vacuum chamber 50 so that the fifth coupling structures 113 do not penetrate through the vacuum chamber 50. This configuration also enhances the sealing performance.

First coupling structures 111 and third coupling structures 112 that have the same shape and same function as the fifth coupling structures are formed on the top surfaces of the first cable holder 101 and the second cable holder 102, respectively; and second coupling holes 114 and fourth coupling holes 115 are formed around a center hole 117 of the cable holder cover 70 at positions corresponding to the first and third coupling structures 111 and 112.

Specifically, the coupling holes formed in the cable holder cover 70, and the coupling structures formed in the vacuum chamber 50, the first cable holder 101, and the second cable holder 102 are coupled to each other with or without screws or pins so that the vacuum chamber 50 and the cable holder are securely coupled to each other, maintaining a hermetic seal.

At this time, an interval between the coupling structures for coupling the cable holder and the cable holder cover to each other is shorter than an interval between coupling structures for coupling the cable holder cover and the vacuum chamber to each other so that a larger number of coupling structures can be arranged. This is because, when the inside pressure of the vacuum chamber 50 is very low, that is, approximately a vacuum so that a force is exerted in a direction from the outside to the inside, the cable holder cover 70 having a larger size than the cable holder installation hole 70 is put in tighter contact with the vacuum chamber 50 but the cable holder having a smaller size than the cable holder installation hole 80 is likely to be sucked into the vacuum chamber 50 due to the force if the cable holder is not firmly attached to the cable holder cover 70. That is, the cable holder cover 70 prevents the cable holder from being sucked into the vacuum chamber 70.

Figure 9:
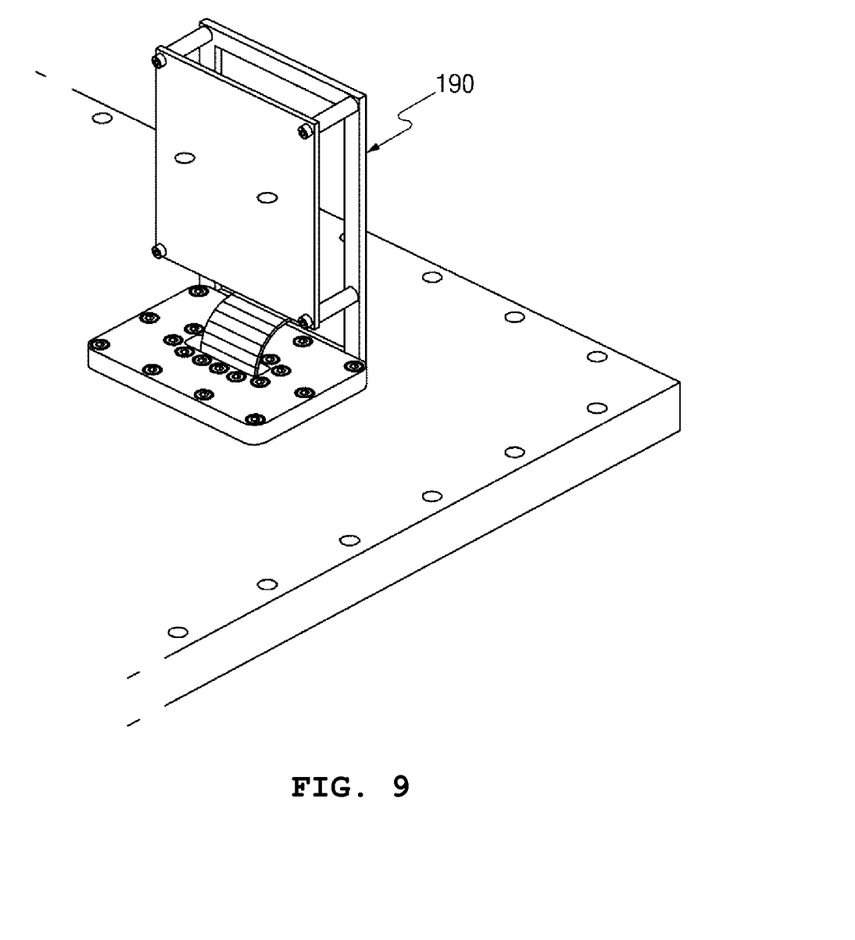
FIG. 9 is a perspective view illustrating an embodiment of an information carrying-out unit.
Figure 10:
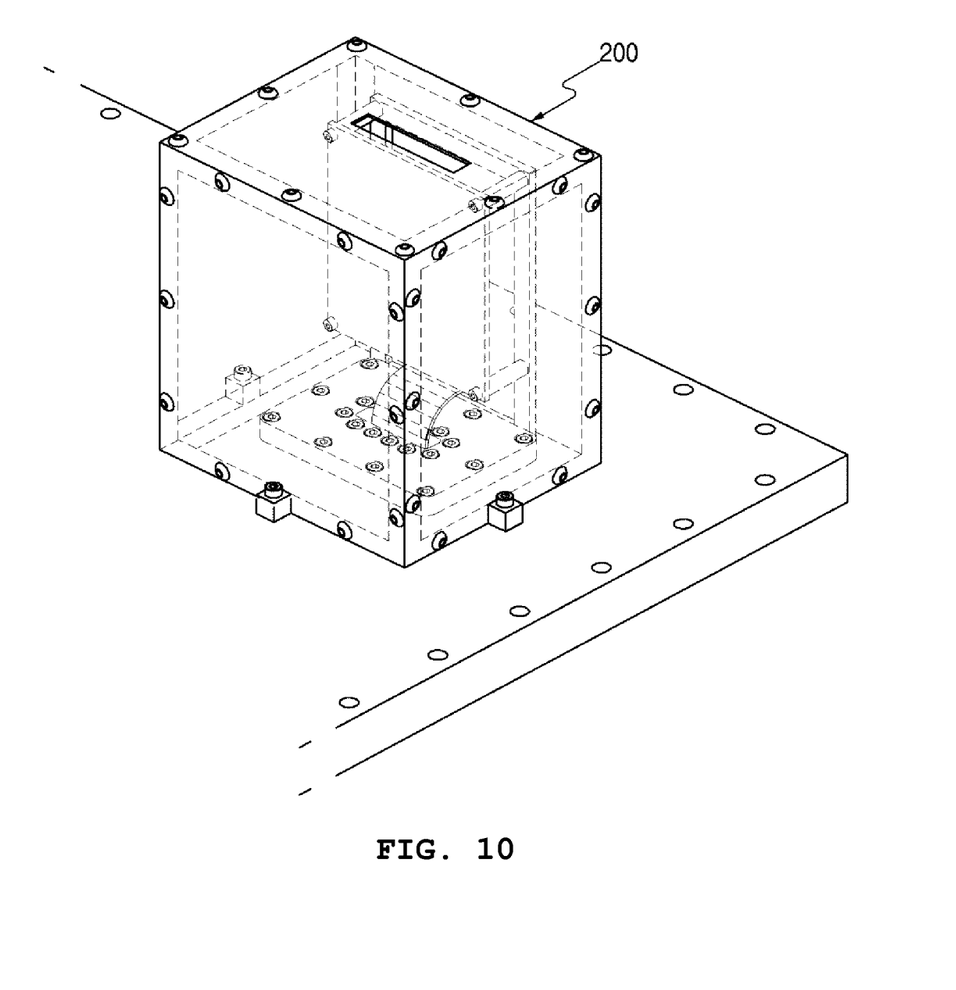
FIG. 10 is a three-dimensional view illustrating a state in which a cable and a information carrying-out unit protection housing are combined.
Figure 11:
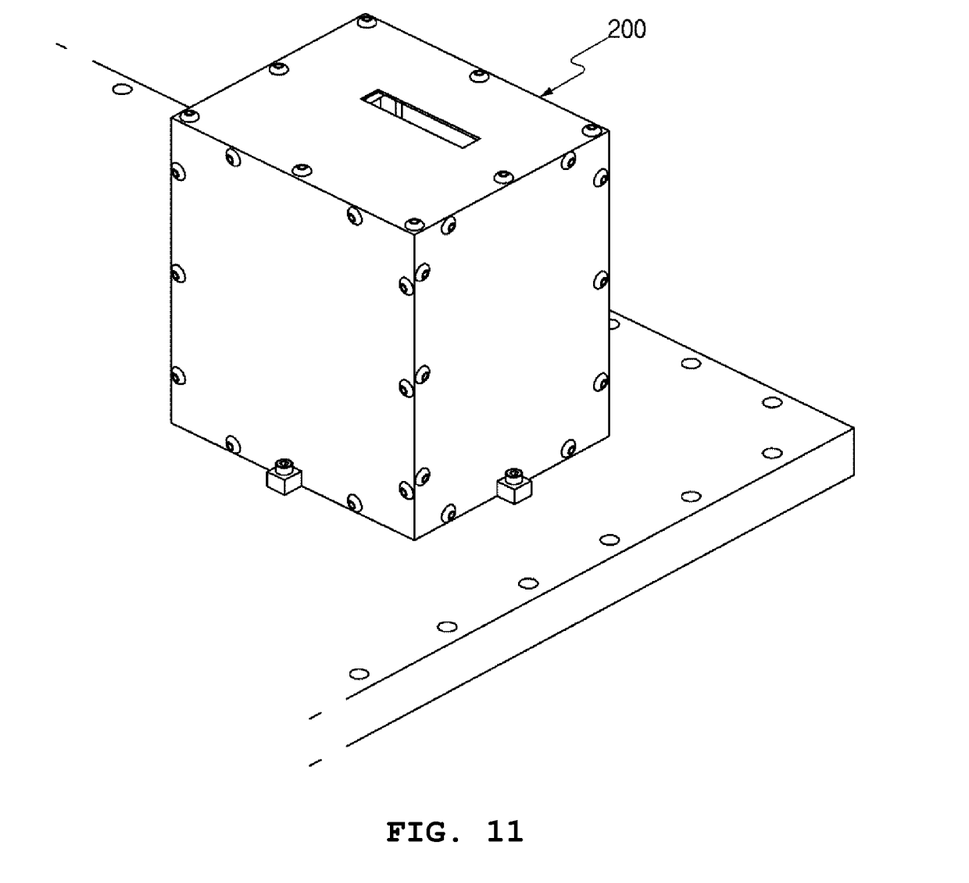
FIG. 11 is a perspective view of the structure of FIG. 10.

FIG. 9 is a perspective view illustrating an embodiment of an information carrying-out unit, FIG. 10 is a three-dimensional view illustrating a state in which the cable is connected to an information carrying-out unit protection housing, and FIG. 11 is a perspective view illustrating the structure of FIG. 10. Illustrated is an information carrying-out unit 190 that transmits information detected by an infrared detector to an external device through the cable 60 which extends from inside to outside the vacuum chamber 50. A housing 200 which protects the information carrying-out unit 190 and the exposed portion of the cable 60 may be further provided.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vacuum wall-through structure to be installed in a wall portion of a vacuum chamber, comprising: a pair of cable holders disposed inside an installation hole formed in the wall portion of the vacuum chamber and including a first cable holder and a second cable holder, the first cable holder including a first engaging hole formed in a lateral side of the first cable holder, the lateral side of the first cable holder facing the second cable holder, a first engaging protrusion formed on and protruding from the lateral side of the first cable holder, a first recessed portion formed between the first engaging hole and the first engaging protrusion and recessed from a surface of the lateral side of the first cable holder, and first coupling structures formed in a top surface of the first cable holder, and the second cable holder including a second engaging hole formed in a lateral side of the second cable holder, the lateral side of the second cable holder facing the first cable holder, a second engaging protrusion formed on and protruding from the lateral side of the second cable holder, a second recessed portion formed between the second engaging hole and the second engaging protrusion and recessed from a surface of the lateral side of the second cable holder, and second coupling structures formed in a top surface of the second cable holder, wherein the second engaging protrusion is inserted into the first engaging hole, and the first engaging protrusion is inserted into the second engaging hole, and when the first cable holder and the second cable holder are coupled with each other, a cable passes through a space formed by the first recessed portion and the second recessed portion from a bottom surface to a top surface of the pair of cable holders; and a cable holder cover unitarily formed in a plane board shape and disposed on an outer surface of the wall portion of the vacuum chamber and covering entirely over the top surfaces of the pair of cable holders, the cable holder cover including a center hole formed in a center portion of the cable holder cover and the center hole is open to both a top side and a bottom side of the cable holder cover to allow the cable to pass therethrough, third coupling structures formed around the center hole of the cable holder cover and open to both the top side and the bottom side of the cable holder cover, and fourth coupling structures formed around the center hole of the cable holder cover and open to both the top side and the bottom side of the cable holder cover, wherein the third coupling structures are arranged such that when the cable holder cover covers the pair of cable holders, each of the third coupling structures is located on a corresponding one of the first coupling structures of the first cable holder, and the fourth coupling structures are arranged such that when the cable holder cover covers the pair of cable holders, each of the fourth coupling structures is located on a corresponding one of the second coupling structures of the second cable holder, and wherein a first O-ring groove is formed in the bottom side of the cable holder cover around the third and fourth coupling structures or in the pair of cable holders, and a first O-ring is inserted in the first O-ring groove to provide a hermetic seal between the air of cable holders and the bottom side of the cable holder cover, wherein the bottom side of the cable holder cover faces the to surfaces of the air of cable holders.

2. The vacuum wall-through structure according to claim 1, wherein when the first cable holder and the second cable holder are combined with each other, an epoxy resin is interposed between the first cable holder and the second cable holder.

3. The vacuum wall-through structure according to claim 1, wherein the cable holder cover further has sixth coupling structures formed along an edge portion thereof to be coupled to fifth coupling structures formed around the installation hole of the vacuum chamber so that the vacuum chamber and the cable holder cover are coupled to each other.

4. The vacuum wall-through structure according to claim 3, wherein an interval between adjacent two structures of the third and fourth coupling structures are shorter than an interval between adjacent two structures of the sixth coupling structures.

5. The vacuum wall-through structure according to claim 1, wherein a second O-ring groove is formed in the bottom side of the cable holder cover along the sixth coupling structures or in the wall portion of the vacuum chamber, and a second O-ring is inserted in the second O-ring groove to provide a hermetic seal between the vacuum chamber and the bottom side of the cable holder cover.

6. The vacuum wall-through structure according to claim 1, wherein the lateral sides of the first cable holder and the second cable holder are three-dimensional so that a tighter contact between the first cable holder and the second cable holder is obtained.

7. The vacuum wall-through structure according to claim 1, wherein the first cable holder and the second cable holder are combined such that a boundary line between the first cable holder and the second cable holder is located along the first O-ring.

* * * * *